INVENTOR.
ROBERT W. DEICHERT
BY Darby & Darby
ATTORNEYS

United States Patent Office 3,017,624
Patented Jan. 16, 1962

3,017,624
INDICATING DEVICE
Robert W. Deichert, Jersey City, N.J., assignor, by mesne assignments, to Fairchild Camera and Instrument Corporation, Syosset, N.Y., a corporation of Delaware
Filed Oct. 10, 1958, Ser. No. 766,516
9 Claims. (Cl. 340—324)

This invention relates to an indicator, and more particularly to a single indicator which will indicate the status of a plurality of measurement and/or control devices.

With the advent of automation, it is becoming increasingly important for an individual at a central location to know the readings or status of a multiplicity of measuring and/or control devices situated at various remote locations. If the remote device is of the "On-Off" or "Safe-Dangerous" type, the presence or absence of an indicating light is sufficient. If, however, the remote device is such that its status varies by degrees, the central location requires a range type indicator, such as a meter, a gauge, or a manometer. As the need for measuring and/or control devices multiplied, the indicators became more numerous; their physical layout became complex; and the problem of reading, and interpretation, became extremely difficult.

It is therefore the principal object of my invention to provide an improved indicator.

It is another object of my invention to provide an indicator which portrays the status of a plurality of remotely positioned measuring devices.

It is a further object of my invention to provide an indicator which will indicate not only "On-Off" and "Safe-Dangerous" situations, but will also indicate relative readings.

Figure 1:
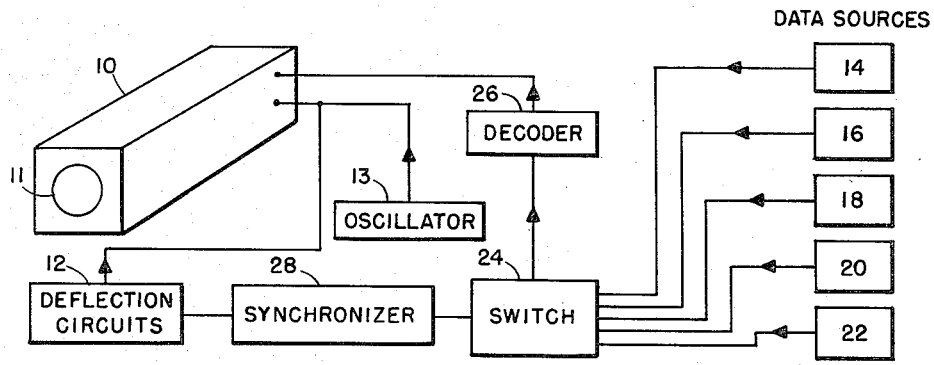
Figure 2:
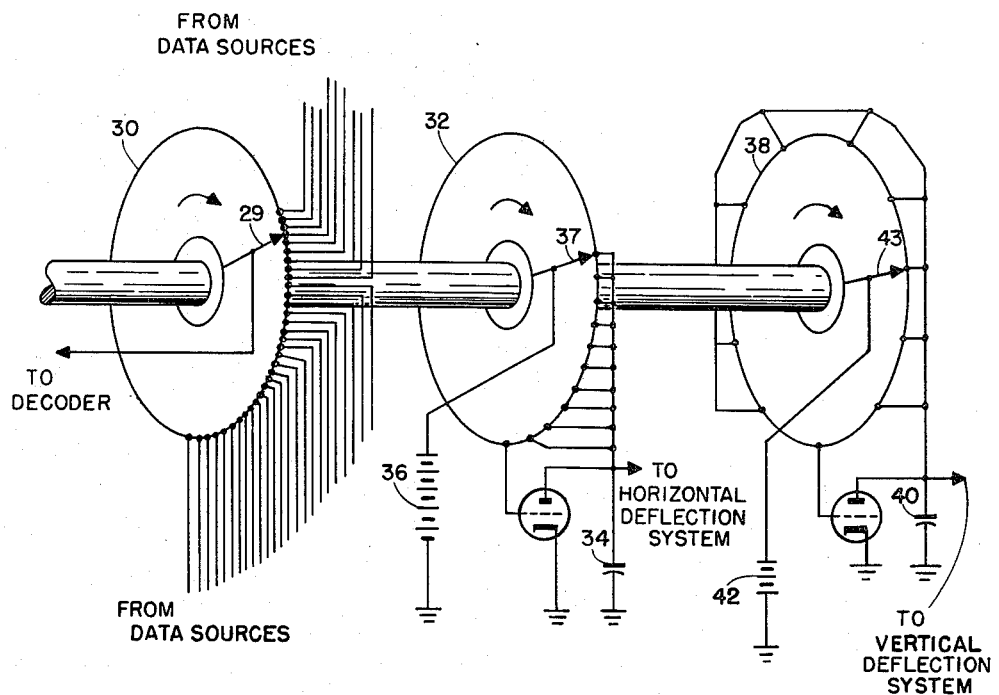

The attainment of these objects and others will be realized from the following specification, taken in conjunction with the drawings, in which, FIG. 1 indicates in block diagram form the basic concept of my invention; and FIG. 2 illustrates a portion of my invention in more detailed form.

Basically, my invention comprises a color television tube which produces a plurality of discrete illuminated spots, suitable means causing each illuminated spot to be associated with a particular remote device. Signals from the various remote instruments are applied to the color tube in such a manner that they cause a predetermined light spot to assume a particular color. In this way each light spot is associated with a particular remote device, and the color of that spot corresponds to the instantaneous status of that device.

FIG. 1 shows the overall concept of my invention. An indicator unit 10 contains a color television tube 11 which is preferably of the three-gun apertured mask type, although other types may be used. For simplicity, the first part of the explanation will be conducted in terms of a cathode ray tube having a single electron gun, which produces light spots of controllable brightness. The use of a color tube will be introduced later, at an appropriate time. As previously explained, the presentation on the tube takes the form of a plurality of discrete spots of light or indicants rather than a continuous display. For convenience, the following explanation will be conducted in terms of a tube which produces one hundred indicants arranged in a 10 x 10 pattern.

As is well known, the usual cathode ray tube has deflection circuits which cause an electron beam to scan the faceplate of the cathode ray tube in a predetermined manner. The beam impinges upon a fluorescent screen, thus producing a moving spot of light which causes a luminous line known as the "trace." Since my invention contemplates the production of spots of light, rather than a continuous trace presentation, a mask having one hundred holes arranged in a 10 x 10 pattern may be positioned within or in front of the color tube. Alternatively, the electron beam may move across the faceplate of the cathode ray tube in a series of jumps. This jump concept permits the electron beam to dwell at particular locations, and thus cause a brighter spot than if the beam swept quickly across that location. Each dwell point will thus produce one of the indicants.

In order to achieve a 10 x 10 presentation, FIG. 1 shows a "jump" deflection circuit 12, which causes the electron beam to move in ten jumps across the width of the faceplate of the tube. The required jump deflection system differs from that usually employed in cathode ray tubes, in that the horizontal deflection voltage must increase in steps. Circuits for producing such stepped voltages for purposes other than deflection are well known in the art under various names, such as "staircase generators" and "counting circuits." One such circuit is described in "Radio Engineering" by Terman, third edition, pages 606–608. When the potential represented by a staircase waveform is applied to the horizontal deflection system of the cathode ray tube, each increase in potential causes the electron beam to jump to a progressively further location. The termination of the staircase waveform causes the beam to "retrace," i.e., return to its starting point.

In order for the electron beam to produce a series of parallel lines of light spots, it must be also deflected vertically after each horizontal scansion. Standard vertical deflection circuitry, as used in television receivers, will produce satisfactory results, although a staircase waveform may also be used.

It will thus be understood that the staircase waveform applied to the horizontal deflection system will produce a horizontal row of light spots. The vertical deflection system repositions the electron beam so that a second row of light spots is produced. This procedure is continued until ten rows, each containing ten light spots, are produced. At this point, vertical and horizontal retrace reposition the electron beam to its original starting point, whereupon another 10 x 10 display may be presented.

Each indicant may be made larger by defocusing the electron beam, or by causing it to "wobble." The wobbling effect can be readily produced by using a two-frequency oscillator 13 to apply high frequencies to the horizontal and vertical deflection systems. The net result would be that while the electron beam tended to dwell at a particular point, the two high frequencies would produce a lissajous figure which would approximate a filled in rectangle.

The foregoing explanation has described how a 10 x 10 pattern of indicants may be produced. Since this 10 x 10 display has one hundred indicants, it can accept information from a hundred different data sources. FIG. 1 indicates by blocks 14–22, a limited number of these data sources. These sources may be measuring devices, switches, relays, etc., which supply information about temperature, pressure, weight, rate of flow, position of relays, etc. Since the signals from remote data sources 14–22 are to be displayed in a sequential manner, they are applied to a switch 24, which feeds them one at a time to indicator 10. The signals from the data sources may be in either binary form or analog form as will be hereinafter discussed. Regardless of their form, the signals are passed through a suitable decoder 26 which converts them into a form which controls the condition (brightness, color, etc.) of the indicants. It is preferable that all the original signals be of the same form; but if this is impractical, different types of decoders may be used, their outputs being fed in proper sequence to indicator 10.

It has previously been stated that each indicant is to portray the status of a given data source. Therefore, synchronization is necessary between the deflection system which determines the position of the indicant, and the input signals which determine the color of the indicant. In order to synchronize switch 24 and deflection circuit 12, a synchronizer 28 is utilized; this may be a mechanical arrangement, an electrical configuration, or a combination of the two. The net result of synchronization is to produce discrete spots of light, specific ones of which may be controlled by signals from specific data sources.

Since each spot of light is associated with a given remote device, it is advantageous to designate the light spots by a symbol; such as a number, a letter, or a combination. This designation may be readily achieved by positioning a symbol adjacent the indicant, or by placing the symbol in such a way that it is silhouetted by the light from the indicant. In this way, each indicant is quickly identifiable.

I have heretofore described the basic principles of my invention, using a block diagram and suggesting the use of well known circuitry or principles. FIG. 2 illustrates a portion of my invention in more detailed form. In accordance with previously disclosed principles, the signals from the data sources are fed to a switch. This switch may be any one of several types; such as a mercury jet, solid state, stepping relays, shift registers, electronic switches, etc. In FIG. 2, I show a mechanical one, similar to an automobile distributor. In this type of switch, a single moving arm 29 wipes sequentially across fixed contacts on a deck or wafer 30. By using such a switch, one hundred input signals may be applied to respective contacts on the wafer 30, while one output signal is produced.

A multiple switch having several ganged decks or wafers may be simultaneously used for several purposes, and thus provide automatic synchronization, as shown in FIG. 2. Thus while deck 30 is used for the switching function, as previously described, other decks may be used for deflection purposes. FIG. 2 shows how deck 32 of the switch may be used for controlling the horizontal deflection of the electron beam. To accomplish this result, the ten successive contacts of deck 32 are connected in parallel, and to a fairly large horizontal deflection capacitance 34. A source of potential 36 is connected to wiper arm 37. As arm 37 rotates, it adds a charge to capacitance 34 each time it wipes across a contact. Thus, the potential at capacitance 34 increases in a series of ten steps. This progressively increasing potential at capacitance 34 is applied to the horizontal deflection system, and causes the electron beam to be deflected in jumps, in this way producing a horizontal row of ten indicants, or light spots. At the eleventh position, wiper arm 37 may be used to close a path which discharges capacitance 34, and thus produces the retrace portion of the horizontal deflection cycle. The remaining contacts of deck 32 may be similarly connected, to produce nine additional sets of indicants.

In order to provide vertical deflection, another deck 38 may be used. An arrangement similar to that for horizontal deflection is used, except that contacts 11, 22, 33 . . . 110 are connected in parallel, and to a vertical deflection capacitance 40. Here too, a source of potential 42 is connected to wiper arm 43, so that the potential at capacitance 40 increases in a series of steps. The voltage of capacitance 40 is applied to the vertical deflection system. In this way, the electron beam is deflected vertically after every row of indicants. Here again, a subsequent contact may be used to discharge the capacitance in order to provide vertical retrace. The vertical deflection system has its contacts positioned to assure that vertical deflection occurs after the end of each horizontal line. Alternatively, a switch deck having only eleven contacts may be used. The above discussion has explained how horizontal and vertical jump deflection can be achieved, only necessary portions and configurations of the decks being shown.

The foregoing explanation was simplified and conducted in terms of a one-gun tube which produced light spots of controllable brightness. My invention, however, contemplates the use of a color tube able to produce colored indicants. Color tubes are capable of producing a spectrum having hundreds of hues, shades, and tints. Since my indicator is designed to distinguish between, or warn about, the status of various remote devices, I have chosen to let the color of the light spots be the distinguishing features. In order for the indicator to be reliable, it is necessary that easily distinguishable colors be used. I have found that eight colors, namely, black, white, green, cyan, blue, magenta, yellow and red, may be readily recognized. It is therefore advantageous to divide the signal from each data source into eight states. This concept will be readily understood if the incoming signals are considered to be in analog form, where the amplitude of the signal varies with the status of the remote device.

In analog type signals, selected amplitude ranges (such as 0–1 volt, 1–2 volts, 2–3 volts, . . . 7–8 volts) may constitute the eight states of the incoming signals. Similarly, in binary type signals, various combination ($2^3$) constitute the eight states of the incoming signals. In either case, each signal state has its own particular significance. Thus, the first signal state would indicate that the particular data source was turned off. The second state might indicate that the remote device is turned on. Other states of the input signal could indicate increasingly higher (or lower) temperatures, pressures, etc., while the highest state may indicate that the device is at its extreme range, or is indicating a dangerous situation. In this way, the status of the remote device determines the state of the input signal, which in turn establishes the condition of the indicant.

It is preferable that the same sequence of colors be used for each indicant. In this way, a given color of the indicant, say black, will always indicate that a device is off. Another color, say white, will always indicate that the device is on. Still another color, say red, would indicate a dangerous condition regardless of which indicant displayed the "danger" color.

In order to control the condition, brightness or color of the indicants, a decoder converts the input signals into a form which can be used by the indicator tube. If the input signals are of the analog type, each signal has different amplitude ranges, or states, as previously discussed. The operation of detecting the amplitude of a signal, and then energizing a particular channel, is known as "quantizing." Many quantizing circuits are known, attention being directed to Patents No. 2,486,391 for Signal Amplitude Responsive Trigger Circuits for Quantizing by Cunningham; No. 2,782,373, for Signal-Amplitude Responsive Circuit by Shumard; and No. 2,838,663, for Signal-Amplitude Responsive Circuit by Goldberg. The above patents describe circuits which supply an output signal on one of a plurality of leads, depending upon the instantaneous value of the input signal. Thus, the state of the analog input signal determines which output lead is energized, the leads being the connections to the guns or color producing circuitry of the cathode ray tube. Thus, any of the above-described circuitry could constitute the decoder for analog type input signals.

If, on the other hand, it were desirable to use binary input signals, use could be made of the teachings of Patents No. 2,714,204, for Translator for Digital Code Group Signals by Lippel and No. 2,715,724 for Converter for Linear and Binary Codes by Oberman. The first of these patents teaches how the angular position of a shaft may be translated into binary signals, while the second patent teaches how binary signals may be converted to analog type signals, which may be used as hereinabove described. Alternatively, a circuit known as a shift register could be used, since this circuit distinguishes between a number of different combinations of pulses, each combination of which would represent the status of the data source.

If desired, the status of the input signals may be determined by their pulse width, suitable pulse width sensitive circuitry being utilized to provide output signals to the desired leads of the color tube.

In each of the above cases, the state of the signal from the remote device energizes circuitry which applies exciting signals to the color television tube. If the indicator tube is of the type which uses three electron guns which produce red, green and blue light, respectively, the guns are selectively energized by the decoded signal in accordance with the states of the input signal. For example, the lowest state input signal is decoded in such a manner that it does not energize any of the electron guns, thus producing a "black indicant." The second state excites all of the guns to produce a white indicant. The third state input signal energizes only the green gun. An input signal having a fourth state would energize both the green and blue guns to produce a cyan indicant. When an input signal of the fifth state is present, only the blue gun is energized. The sixth state excites both the red and blue guns to give a magenta indicant, while the seventh state produces a yellow spot by exciting both the red and green guns. Finally, the eighth state of the input signal is decoded to excite only the red gun. Additional color combinations may be produced, depending upon the number of different amplitudes it is desired to recognize, and the number of colors which may be readily distinguished from each other.

I have described the principles of my invention, and shown and discussed embodiments thereof. Others, within the scope of my invention, will occur to those in related arts. I desire therefore to be limited not by the foregoing examples, illustrations and explanations, but only by the following claims.

What is claimed is:

1. An indicating system comprising a cathode ray tube capable of color display; means producing a plurality of individual fixedly positioned indicating spots on the face of said tube; a plurality of data sources supplying information to be presented on said tube face; means causing each said source to be associated with a particular one of said fixedly positioned spots; and means causing the color of each said fixed spot to vary in accordance with the data supplied from each said associated source.

2. The device of claim 1 wherein said indicating spot producing means comprises an apertured mask.

3. The device of claim 1 wherein said indicating spot producing means comprises a jump-type horizontal deflection system.

4. The device of claim 3 wherein said indicating spot producing means comprises a jump-type vertical deflection system.

5. The device of claim 3 wherein said means causing each said source to be associated with a particular spot includes switching means and means to synchronize said switching means with said deflection system.

6. The device of claim 1 wherein said information supplied by said data sources includes signals having a plurality of states; means to decode the state of said signals; and means whereby said decoded signals control said color of said associated spot.

7. An indicator for displaying the status of each of a plurality of data sources, each of which provides signals having a multiplicity of states, comprising: means to produce a like plurality of discrete elemental indicating areas, said means comprising a television type color tube; deflecting means for said tube; means causing individual ones of said indicating areas to be associated with specific data sources, said means comprising a switch connected between said sources and said tube; means to synchronize said deflection circuit and said switch; and decoding means causing said signals to control the color of said indicating areas.

8. The apparatus of claim 7 wherein said deflection means and said switch are part of the same assembly.

9. A display system comprising: a television type color tube; means to produce a plurality of fixedly positioned indicants, said means comprising a jump-type horizontal deflection system and a jump-type vertical deflection system whereby said indicants produce a matrix like pattern of individual spots; means whereby said indicants may change their color; a like plurality of data sources whose status is to be displayed; means whereby each said source produces output signals; means causing the state of said output signals to correspond with the status of said sources; means causing selected data sources to be associated with particular individual indicatnts, said means comprising a switch and means to synchronize said switch and said deflection circuits; means causing said indicants to assume a color corresponding to the state of the signal from said associated data source whereby the color of any given indicant corresponds to the status of a given data source; and means enlarging said indicants.

References Cited in the file of this patent
UNITED STATES PATENTS 2,412,350     Morgan _____ Dec. 10, 1946

OTHER REFERENCES

R. C. A. Victor Color Television Receivers, Models 21–CT661u, 21–CT662u, Service Data 1955, No. F5, pp. 23–26.